United States Patent [19]

Ritter

[11] 3,841,368

[45] Oct. 15, 1974

[54] ROUTING DEVICE

[76] Inventor: Nicholas H. Ritter, 11318 Nashville Ave., Worth, Ill. 60635

[22] Filed: Aug. 20, 1973

[21] Appl. No.: 389,965

[52] U.S. Cl...... 144/134 R, 144/134 D, 144/136 C, 144/137, 144/136 B, 90/13.2, 90/15, 144/144
[51] Int. Cl............................................. B27c 5/10
[58] Field of Search............ 144/144 R, 144 A, 137, 144/136 C, 134 R, 134 D, 136 B; 83/471.3, 486, 486.1; 90/13.2, 15

[56] References Cited
UNITED STATES PATENTS 1,352,196    9/1920    Hunter ............................ 144/130 B

*Primary Examiner*—Francis S. Husar
*Attorney, Agent, or Firm*—Evan D. Roberts

[57] ABSTRACT

A routing device having parallel guides on a guide base to position a work piece therebetween, a tool platform to position and support the tool, a tool support plate and a frame to provide angular orientational movement of the tool, and selective indexing means between the guides and the frame, the frame and the blade, and the platform and the plate.

8 Claims, 6 Drawing Figures

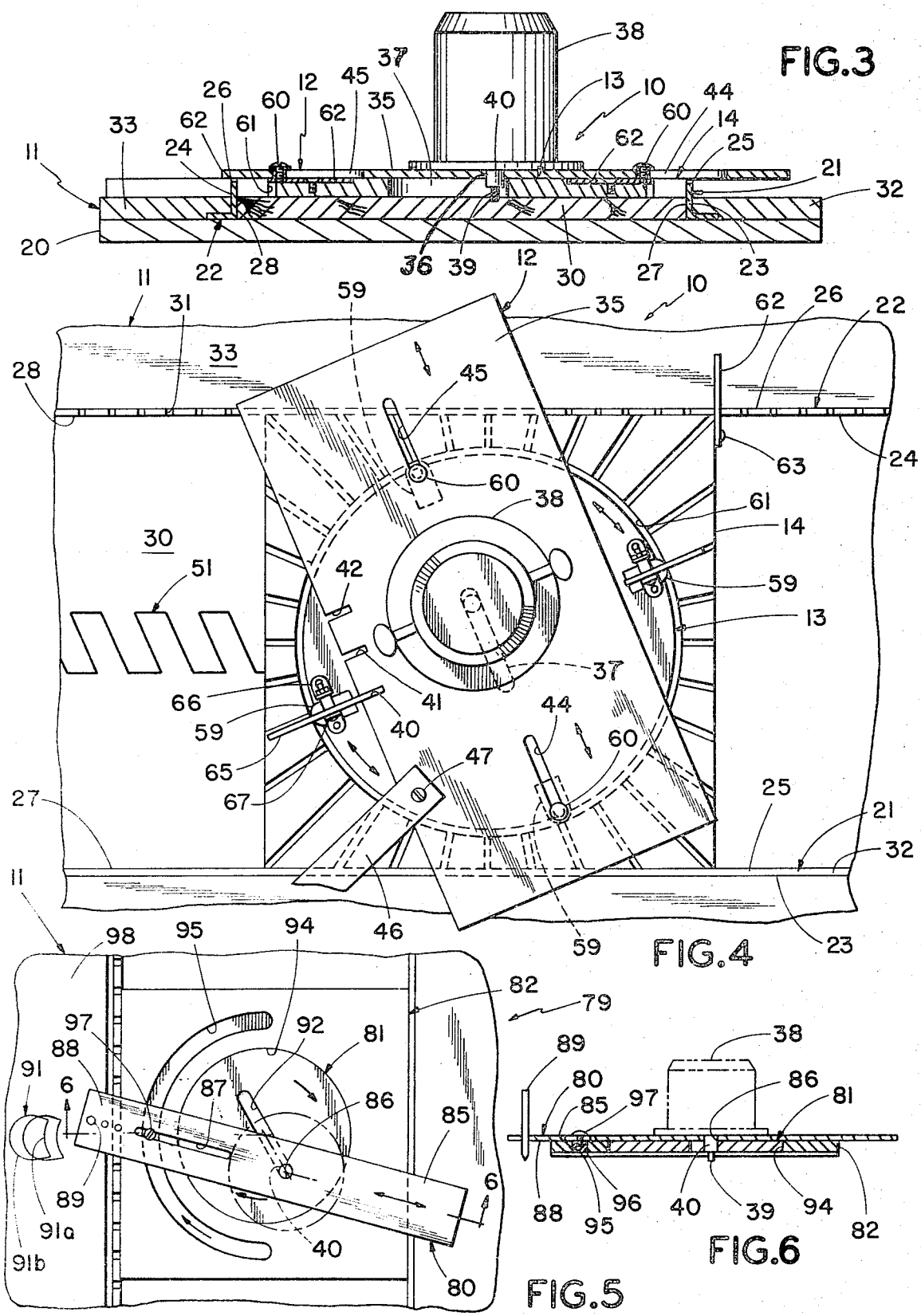

ROUTING DEVICE

SUMMARY OF THE INVENTION

This invention generally relates to a routing device wherein a primary object thereof is to provide interconnected guide, platform, plate, and frame structures wherein the work piece is positioned with respect to the routing tool and the tool is selectively manipulatable to move in a selective path to provide a given design on the work piece by the action of the router.

It is another object of this invention to provide a routing device having the capability of selectively providing an infinite number of routed patterns in a work piece which can include arcuate and circular configurations in addition to angular and square linear configurations.

It is a further object of this invention to provide a routing device which is capable of providing an infinite number of routed patterns in a work piece and which is capable of recording the selected manipulations that resulted in said pattern to facilitate the identical reproduction of said pattern in subsequent work pieces.

A further object of this invention is to provide a routing device which provides an extensive number of manipulative and selective settings which are individually easy to follow and understand, but which collectively are capable of providing intricate, complicated and widely variable and creative routing patterns in a work piece.

Other objects, advantages, and novel aspects of this invention will become apparent upon consideration of the following detailed description in conjunction with the accompanying drawings wherein:

FIG. 3 is a partial sectioned elevation view taken along line 3—3 of FIG. 2 illustrating the interposition of the elements and the invention with respect to the work piece;

FIG. 4 is an enlarged partial plan view of the routing device of this invention illustrated in FIG. 1 showing an angular positionment of the tool platform by virtue of an angular positionment of the plate within the frame to provide an angular routed pattern on the work piece;

FIG. 5 is a plan view of a frame and tool platform of a second embodiment of this invention illustrating a frame particularly adapted to provide circular and arcuate manipulations and relative patterns by the routing tool; and FIG. 6 is a vertical sectional view taken along line 6—6 of FIG. 5 showing the interrelationship of the elements of the frame of the second embodiment of this invention.

Figure 1:
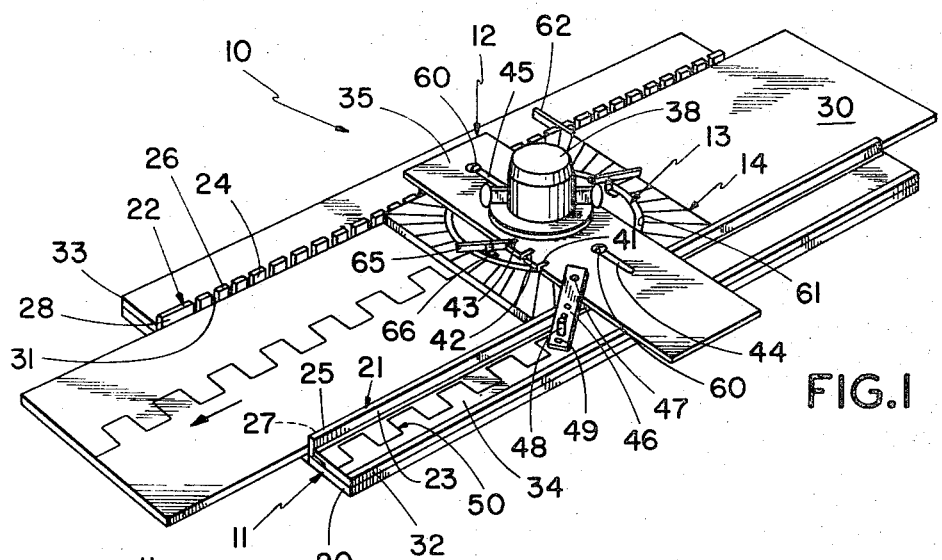
FIG. 1 is a perspective view of a first embodiment of the routing device of this invention showing the general utilization thereof with respect to a work piece and illustrating a pattern or design that can be produced thereby.

A first illustrative embodiment of the routing device of this invention, generally designated by the numeral 10 (FIGS. 1-4), is shown in operation with respect to a wooden panel work piece. Router device 10 generally includes a guide base 11, tool platform 12, support plate 13, and frame 14.

Figure 2:
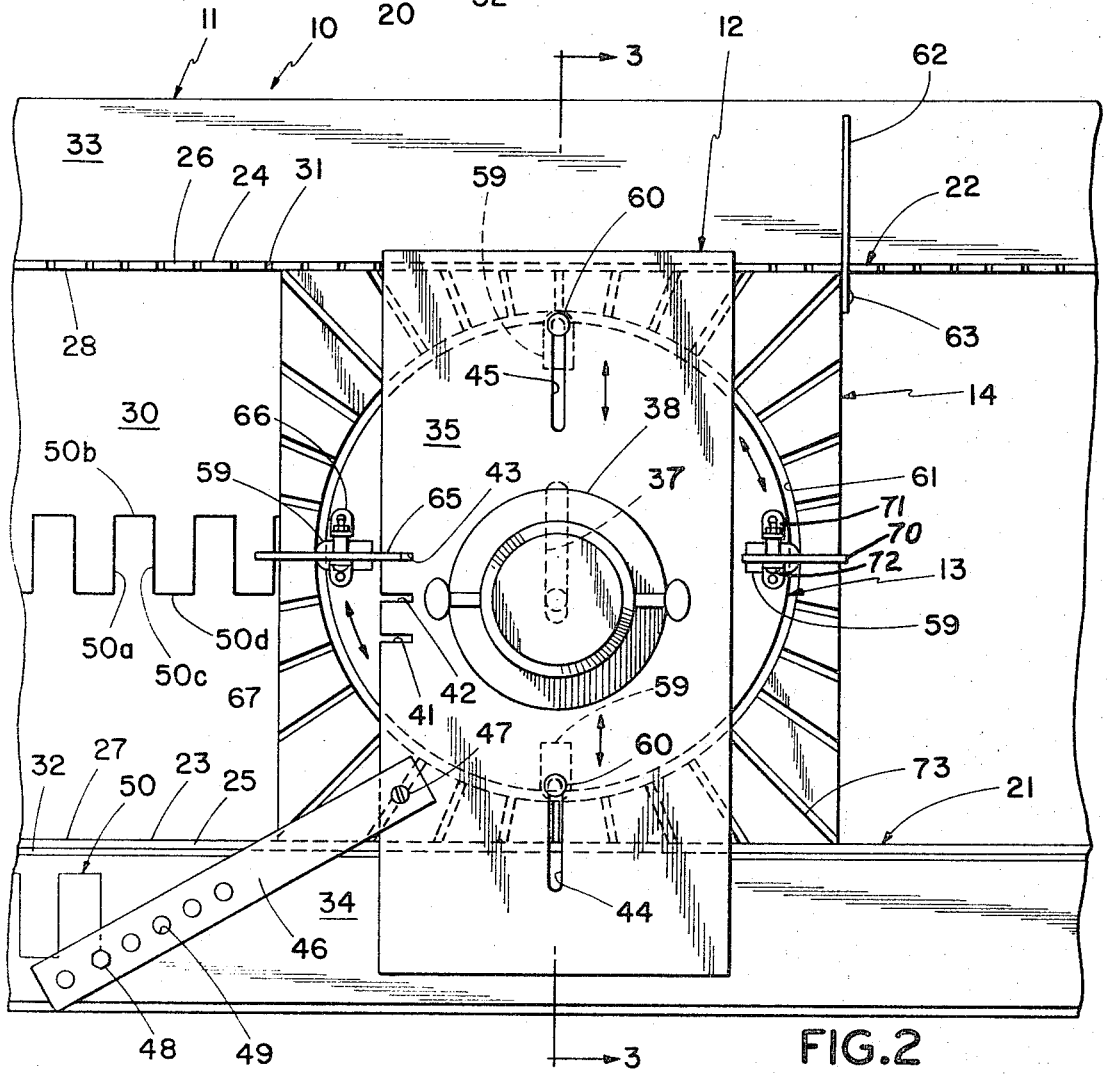
FIG. 2 is an enlarged partial plan view of the routing device of this invention illustrated in FIG. 1 illustrating a vertical alignment of the basic elements thereof and the indexing means therebetween.

Guide base 11 is provided with a base plate 20 (FIGS. 1 and 3) upon which two parallel angle guides 21 and 22 are secured with respective vertically extending portions 23 and 24 thereof providing parallel upper surfaces 25 and 26 for supporting tool support plate 12. Opposing inner surfaces 27 and 28 of guides 21 and 22 are adapted to alternatively or collectively position a work piece 30 for longitudinal movement therebetween. Either or both of guides 21 and 22 are provided with indexing slots 31 and pattern table strips 32 and 33 are respectively positioned adjacent guides 21 and 22 to accommodate a removable pattern strip such as 34 (FIGS. 1 and 2).

Tool platform 12 (FIGS. 1-4) is provided with an upper surface 35 having an aperture 36 to support a tool 38 with a router 39 thereof (FIG. 3) extended through aperture 36 (FIGS. 2 and 3) and is supported on surfaces 25 and 26 of guides 21 and 22 with the extending router 39 in working engagement with work piece 30 (FIG. 3) and a non-cutting or bearing portion 40 in slot 36. Indexing slots 41, 42, and 43 (FIGS. 1, 2, and 4) are provided along one or more edges of platform 12 and slots 44 and 45 are provided therein to allow slidable connection of platform 12 with plate 13 as hereinafter described.

An arm or extension 46 (FIGS. 1, 2, and 4) is adjustably secured to platform 12 by a screw or the like 47 and is adapted to receive a pointer or marking scribe 48, such as a ball point pen, threadably mounted in selectable apertures 49. The pointer or marker 48 can thereby either be caused to follow a pattern 50 (FIGS. 1 and 2) on a pattern sheet 34 or to record movement of platform 12 through the operation of the invention by marker 48 respectively during operation.

Support plate 13 is circular and provided with headed pins 60 extending through slots 44 and 45 and threaded into two of four bearings 59 of tool platform 12 to slidably mount tool platform 12 to tool support plate 13. An elongated slot 37 is provided in plate 13 to accommodate router bearing portion 40 and router cutting portion 39 in engagement with work piece 30. Support plate 13 is rotatably and slidably mounted in a complemental circular aperture 61 of frame 14 on bearings 62. Longitudinal indexing and support means (FIGS. 1-4) is provided between guide base 11, tool platform 12, frame 14 and includes angle guides 21 and 22 which guide frame 14 by surfaces 27 and 28. A lever 62 pivotally connected to frame 14 by pin 63 is adapted to selectively engage indexing slots 31 to position frame 14, plate 13, and tool platform 12 along guide base 11.

A linear indexing means (FIGS. 1, 2, and 4) is provided between platform 12 and plate 13 and includes a lever 65 pivotally mounted on a plate bracket 66 by a pin 67. Lever 65 is thereby adapted to be selectively engaged in one indexing slot 41, 42, or 43, or additional similar slots which could be provided, in platform 12 to selectively index platform 12 with respect to plate 13.

Angular indexing means (FIGS. 1, 2, and 4) is provided between plate 13 and frame 14, and includes a lever 70 pivotally mounted on a plate bracket 71 by pin 72. Lever 70 is thereby adapted to selectively engage radial slots 73 formed in frame 14 along radii having a center coincident with the center of plate 13 whereby plate 13 may be selectively rotatably positioned within frame 14 to accordingly angularly position tool platform 12.

The second illustrative embodiment of the routing device of this invention is generally designated by the numeral 79 and is represented, in part, by the structures illustrated in FIGS. 5 and 6. FIGS. 5 and 6 generally illustrate a tool platform 80, tool support plate 81, and frame 82 which are substituted for the tool platform 12, support plate 13, and frame 14 of the first embodiment 10 of this invention (FIGS. 1-4), and are utilized with the other structures of the first embodiment 10 of this invention to comprise this second embodiment.

Tool platform 80 is provided with an upper surface 85 having an aperture 86 to support the tool 38 with the router 39 thereof extended through aperture 86 and is supported on surfaces 25 and 26 of guides 21 and 22 with the extending router 39 in working engagement with work piece 30. A slot 87 is provided through platform 80 to allow slidable connection with plate 81.

An arm or extension portion 88 of tool platform 80 (FIGS. 5 and 6) is adapted to receive a pointer or marking scribe 89, such as a ball point pen, threadably mounted in selectable apertures 90. The pointer or marker 89 can thereby either be caused to follow a pattern such as 91 (FIG. 5) on pattern sheet 34, or to record movement of platform 80 through the operation of the invention during operation.

Support plate 81 is circular and provided with a slot 92 to accommodate bearing pin or non-cutting portion 40 of router 39. support plate 81 is rotatably slidably circumferentially mounted in a complemental circular aperture 94 of frame 82 and axially against work piece 30. Frame 82 (FIGS. 5 and 6) is provided with an arcuate slot 95 having a slidable bearing pin 96 therein which is slidably secured to tool platform 80 by headed screw 97.

Longitudinal indexing and support means is provided in this second embodiment 79 of the invention (FIGS. 5 and 6) between guide base 11, tool platform 80, frame 82 and includes angle guides 21 and 22, which guide frame 82 by surfaces 27 and 28. A linear indexing means (FIGS. 5 and 6) is provided between platform 80 and plate 81 and includes plate slot 92, platform aperture 86, router bearing or pin portion 40 to selectively index and position platform 80 with respect to plate 81. Angular indexing means (FIGS. 5 and 6) is provided between plate 81 and frame 82 and includes frame slot 95, platform 80 and slots 95 and 87, and router bearing portion 40 pivotally and slidably engaged in platform 86 and plate slot 92.

OPERATION

In operation, the first embodiment of this invention as illustratively represented by numeral 10 (FIGS. 1-4) is operated by either of two related modes. The first mode is to provide an engraved or routed pattern on a work piece, to be spontaneously created by the operator as the device is operated. The movements of this operation are recorded on the pattern strip 34 by marker 48 to allow the pattern to be reproduced on subsequent work pieces by the second mode. The second related mode is to provide an engraved or routed pattern on a work piece as a result of a preconceived pattern set forth on a pattern strip 34 used as a guide for the manipulation of the device. For purposes of illustrating the operation of the first embodiment of this invention, the device 10 will be described in the first operation mode wherein the device is manipulated by the operator to produce a desired pattern and the pattern thus created is recorded on pattern strip 34 to record, and direct, the operator in the reproduction of that same pattern on subsequent work pieces as desired (mode 2).

Initially, a work piece 30 is slidably inserted between angle guides 21 and 22 on guide base 11 with surfaces 27 and 28 of angle guides 21 and 22 in engagement with work piece 30 which in turn is secured against movement by a clamp or other similar means (not shown). The lateral dimension of frame 14 substantially corresponds to the lateral distance between parallel angle guides 21 and 22 and is positioned therebetween with plate 13 positioned coincident with opening 61 of frame 14 and with tool support platform 12 slidably attached to plate 13 by pins 60 in slots 44 and 45, and supported on surfaces 25 and 26 of angle guides 21 and 22.

Router tool 38 is placed on surface 35 of platform 12 with the router portions 40 and 39 positioned in aperture 36 of platform 12 and slot 37 of plate 13 respectively so that the cutting portion 39 of the router is in engagement with the work piece 30 (FIG. 3). The routing tool 38 is longitudinally positionable over the work piece 30 by movement of the frame 14 along guides 21 and 22 and is positioned therealong by the positionment of lever 62 and selected slots 31 of guides 21 and 22. Tool 38 is moved laterally and angularly with respect to guides 21 and 22 to similarly route or engrave work piece 30 by positioning platform 12 laterally on guides 21 and 22. This lateral positionment is accomplished by moving platform 12 laterally, and is indexed in this movement by selectively positioning lever 65 in one of slots 41, 42, or 43 which similarly positions the engraving router 39 with respect to work piece 30. Angular positionment of engraving router 39 is accomplished by selectively rotating plate 13 within frame 14 and is indexed in this radial or rotational position by the selective insertion of frame lever 70 in any selected one of radial slots 73 in frame 14.

For example, to produce the pattern illustrated (FIGS. 1 and 2) with the tool 38 positioned as shown (FIG. 2), lever 65 would be pivoted on pin 67 to remove lever 65 from platform slots 43 and platform 12 would be moved laterally (upwardly in FIG. 2), to a position where lever 65 could be rotated into slot 41 of platform 12. This would result in a lateral portion such as 50a of pattern 50. Next, lever 62 is pivoted upwardly about pin 63 to disengage lever 62 from slot 31 in guide 22, and frame 14 is moved to the right (FIG. 2) a sufficient distance whereby lever 62 can be pivoted about pin 63 to insert lever 62 in the next slot 31 to the right which results in a pattern portion such as 50b of pattern 50.

To produce a pattern portion such as 50c, at this point lever 65 is pivoted about pin 67 to remove same from slot 41 of platform 12, and platform 12 is thereupon returned to its original position (FIG. 2) during which time router 39 will produce the 50c type lateral pattern portion. To provide pattern portion such as 50d, lever 62 is again manipulated with respect to slots 31, and frame 14 is moved to the right as previously described whereupon router 39 will provide a pattern portion such as 50d.

The previous manipulations, if continuously repeated (mode 1) in the sequence as described, will provide the general pattern such as 50 on work piece 30 during which time platform 12 will cause marker 48 through arm 46 to trace pattern 50 on pattern sheet 34. Conversely, (mode 2) pattern 50 can be reproduced on subsequent work pieces by causing platform 12, plate 13, and frame 14 to be manipulated as heretofore described by causing marker 48 to follow the established pattern 50 on pattern sheet 34 to produce that same pattern on work piece 30.

Any number of patterns can be produced on a work piece 30 by: laterally positioning platform 12 which carries router tool 38 therewith; moving platform 12 with respect to selected pins 60 as indexed or positioned by lever 65 in indexing slots 40–42; and by angularly positioning plate 13 over work piece 30 by radial manipulation thereof within frame 14 and indexing same by selectively indexing lever 70 in radial frame slots 73.

The illustrative frame 14 depicted herein is provided with indexing slots 73 on 15° increments, and accordingly, with plate 13 positioned as indicated (FIG. 4), platform 12 is positioned 30° from the lateral alignment with respect to guides 21 and 22 illustrated in FIGS. 1 and 2. In this (FIG. 4) 30° positionment of plate 13, pattern 50 in work piece 30 which is created as heretofore described will be modified to that of 51 (FIG. 4). Thus, it can be readily seen how numerous variations of patterns on selected work pieces 30 can be provided by careful selection and manipulation of the elements of this invention and the selection of the indexing and positioning apparatus thereof.

In operation, the second embodiment of this invention, illustratively represented by numeral 11 (FIGS. 5 and 6 and with FIGS. 1 and 2), is operated by either of the two modes above referred to with respect to the first embodiment of this invention. For purposes of the description of the operation of this second embodiment of this invention, the device 11 will be described in the first operation mode. The second mode can be understood therefrom.

Initially, a work piece 30 is slidably inserted between angle guides 21 and 22 on guide base 11 with surfaces 27 and 28 of angle guides 21 and 22 in engagement with work piece 30 which in turn is secured against movement by a clamp or other similar means (not shown). The lateral dimension of frame 82 substantially corresponds to the lateral distance between parallel angle guides 21 and 22 and is positioned therebetween with plate 81 positioned coincident with opening 94 of frame 82 and with tool support platform 80 slidably attached to plate 82 by router pin portion 40 in slot 92, and supported on surfaces 25 and 26 of angle guides 21 and 22 (FIG. 5).

Router tool 38 is placed on surface 85 of platform 80 with the router portions 40 and 39 positioned in aperture 86 of platform 80 and slot 92 of plate 82 respectively so that the router cutting portion 39 is in engagement with the work piece 30 (FIG. 6). The routing tool 38 is longitudinally positionable over the work piece 30 by movement of frame 82 along guides 21 and 22 and may be positioned therealong by a lever mechanism such as lever 62 as described with respect to the first embodiment (FIGS. 1–4). Tool 38 is moved laterally and angularly with respect to guides 21 and 22 to similarly angularly route or engrave work piece 30 by positioning platform 80 laterally on guides 21 and 22. This lateral positionment is accomplished by moving platform 80 laterally. Angular positionment of engraving router 39 is accomplished by selectively rotating plate 81 within frame 82.

For example, to produce the pattern generally illustrated by the numeral 91 (FIG. 5) with the tool 38 positioned as shown (FIGS. 5 and 6), platform 80 is pivoted about pin 97 on bearing 96 in frame slot 95 which will route or engrave a pattern in work piece 30 such as 91a illustrated by pattern 91 on pattern sheet 98. During this movement of platform 80, router bearing 40 will move in plate slot 92 which, when positioned parallel (not shown), with guides 21 and 22, will produce the pattern portion such as 91a on work piece 30. The pattern actually produced by the position of plate slot 92 illustrated will cause pattern portion 91a to be on an angle upwardly and to the left from the vertical (FIG. 5) which is somewhat different from the pattern particularly illustrated.

Also, it should be noted that plate 81 can be rotated 360° in frame aperture 94 whereupon, depending upon the position of platform 80, as a result of the position of screw bearing 97 in frame slot 95, a small radius portion of pattern 91b will be engraved or routed on work piece 30.

Thus, it can be seen that the second embodiment 79 can be utilized, in conjunction with guide rails 21 and 22 and the portions of the first embodiment 10 as described, to provide a pattern 91 comprised of large radius portions 91a and small radius portions 91b. Also, it should be noted that routing tool 38 can be manipulated to engrave work piece 30 by the alternate utilization of platform 12, plate 13, and frame 14 of the first embodiment of this invention, or platform 80, plate 81, and frame 82 of the second embodiment of this invention to provide a composite engraving pattern consisting of the straight lines of patterns such as 50, 51, etc. (FIGS. 1–4) and the varied curvilinear pattern such as 91 provided by the second embodiment of this invention (FIGS. 5 and 6), whereby by virtue of the novel structural aspects of the invention herein described, an infinite varied pattern can be provided on an individual basis or subsequently repeatedly duplicated as desired.

The manipulations as above described can be utilized in varied forms to provide a pattern such as 91 on work piece during which time platform 80 will cause marker 89 through arm extension 88 to trace pattern 91 on pattern sheet 98. Conversely, pattern 91 can be reproduced on subsequent work pieces 30 by causing platform 80, plate 81, and frame 82 to be manipulated as heretofore described by causing marker 89 to follow the established pattern 91 of pattern sheet 98 to produce that same pattern on work piece 30.

It is to be understood that the invention is not to be limited to the specific constructions and arrangements shown and described, as it will be understood to those skilled in the art that certain changes may be made without departing from the principles of the invention.

What is claimed is:

1. A device for guiding the cutting tool of a routing tool with respect to a work piece surface comprising a guide base having parallel longitudinal indexing and support means thereon adapted to position a work piece and provide a primary guide for the tool to be used thereon, a tool platform adapted to position and support the routing tool on said parallel means in working contact with the work piece, a plate slidably connected with said tool platform for relative movement therewith, and a frame guided longitudinally by said parallel means and adapted to retain said plate rotatable therewith whereby the selective movement of said plate in said frame and said platform with respect to said plate will cause the tool cutter to operate in a given path with respect to the work piece surface.

2. A routing device as defined in claim 1 wherein said frame and plate have angular indexing means operable therebetween to selectively angularly position said plate relative to said frame.

3. A routing device as defined in claim 1 wherein said plate and platform have linear indexing means operable therebetween to selectively linearly position said platform relative to said plate.

4. A routing device as defined in claim 1 wherein said frame and plate have angular indexing means operable therebetween to selectively angularly position said plate relative to said frame, and said plate and platform have linear indexing means operable therebetween to selectively linearly position said platform relative to said plate.

5. A routing device as defined in claim 1 wherein said plate slidable connection is linear to provide linear movement only between said platform and said plate.

6. A routing device as defined in claim 1 wherein said tool support platform is slidably and pivotally connected to said plate and said frame by a plate slot through said plate adapted to slidably and pivotally receive the routing tool cutter therethrough, a frame slot in said frame, and a pin positioned in said frame slot and slidably connected to said platform to pivotally and slidably interconnect said platform with said frame, whereby the selective rotation of said plate in said frame and said platform pin connection in said frame and platform slots will cause the tool cutter to operate in given curved paths.

7. A routing device as defined in claim 1 wherein said plate is slidably connected with said tool platform by linear means whereby the tool cutter will be caused to operate in a given linear path with respect to the work piece surface.

8. A routing device as defined in claim 1 wherein said platform is slidably connected with said plate by linear means and said frame by curved means whereby the tool cutter will be caused to operate in a given curved path with respect to the work piece surface.

* * * * *